United States Patent
Dlugoss

(10) Patent No.: US 9,200,686 B2
(45) Date of Patent: Dec. 1, 2015

(54) BINARY CLUTCH ASSEMBLY CONTROL IN NEUTRAL-TO-DRIVE OR NEUTRAL-TO-REVERSE TRANSMISSION SHIFTS

(71) Applicant: GM GLOBAL TECHNOLOGY OPERATIONS LLC, Detroit, MI (US)

(72) Inventor: Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 13/659,976

(22) Filed: Oct. 25, 2012

(65) Prior Publication Data

US 2014/0121923 A1    May 1, 2014

(51) Int. Cl.
*B60W 10/02*    (2006.01)
*F16D 48/06*    (2006.01)

(52) U.S. Cl.
CPC ...... *F16D 48/06* (2013.01); *F16D 2500/10412* (2013.01); *F16D 2500/30808* (2013.01); *F16D 2500/31466* (2013.01); *F16D 2500/70426* (2013.01); *F16D 2500/70454* (2013.01); *F16D 2500/70458* (2013.01); *F16D 2500/7109* (2013.01)

(58) Field of Classification Search
CPC ....................................................... F16D 48/06
See application file for complete search history.

(56) References Cited

U.S. PATENT DOCUMENTS

| | | | | |
|---|---|---|---|---|
| 4,740,898 A * | 4/1988 | McKee et al. | | 701/70 |
| 4,965,879 A * | 10/1990 | Fischer, Jr. | | 701/3 |
| 6,126,566 A * | 10/2000 | Kerr | | 475/173 |
| 6,367,604 B1 * | 4/2002 | Kerr | | 192/3.28 |
| 6,988,605 B2 * | 1/2006 | Senger et al. | | 192/103 F |
| 7,169,082 B2 * | 1/2007 | Rieger et al. | | 477/181 |
| RE41,804 E * | 10/2010 | Rieger et al. | | 477/181 |
| 7,949,416 B2 * | 5/2011 | Fuller | | 700/31 |
| 8,387,730 B2 * | 3/2013 | Bouchon | | 180/65.265 |
| 8,682,551 B2 * | 3/2014 | Naqvi et al. | | 701/67 |
| 8,682,552 B2 * | 3/2014 | Tsutsui et al. | | 701/67 |
| 8,886,423 B1 * | 11/2014 | Dlugoss et al. | | 701/54 |
| 2002/0104729 A1 * | 8/2002 | Kerr | | 192/45 |
| 2003/0106766 A1 * | 6/2003 | Johnson et al. | | 192/103 R |
| 2003/0196862 A1 * | 10/2003 | Kerr | | 192/3.21 |
| 2004/0045784 A1 * | 3/2004 | Ebert et al. | | 192/87.13 |
| 2008/0132378 A1 * | 6/2008 | Bouchon | | 477/3 |
| 2010/0063698 A1 * | 3/2010 | Lee et al. | | 701/67 |
| 2010/0228412 A1 * | 9/2010 | Sah | | 701/22 |
| 2010/0261577 A1 * | 10/2010 | MacFarlane et al. | | 477/84 |

(Continued)

*Primary Examiner* — John R Olszewski
*Assistant Examiner* — Jean-Paul Cass
(74) *Attorney, Agent, or Firm* — Quinn Law Group, PLLC

(57) ABSTRACT

A vehicle includes an engine, transmission, and controller. The transmission has gear sets each having multiple nodes, an input member continuously connected to the engine and one of the gear sets, and a binary clutch assembly. The controller executes a method to detect a requested event of a binary clutch engagement and to command a calibrated energy pulse from the engine to the input member in response to the requested event. The energy pulse reduces slip across the binary clutch assembly. The controller applies the binary clutch assembly within a calibrated window of initiation of the pulse, and may shift the transmission into reverse or drive. A transmission has the controller, at least first, second, and third gear sets, an input member selectively connected to the first gear set and continuously connected to the second gear set, and a binary clutch assembly connected to the first and second gear sets.

13 Claims, 2 Drawing Sheets

(56) References Cited

U.S. PATENT DOCUMENTS

| | | | |
|---|---|---|---|
| 2011/0071742 A1* | 3/2011 | Inuta et al. | 701/68 |
| 2011/0264344 A1* | 10/2011 | Yamawaki | 701/68 |
| 2011/0300991 A1* | 12/2011 | Walker et al. | 477/79 |
| 2012/0158264 A1* | 6/2012 | Kuras et al. | 701/67 |
| 2012/0208672 A1* | 8/2012 | Sujan et al. | 477/5 |
| 2012/0309585 A1* | 12/2012 | Whitney et al. | 477/5 |
| 2013/0143715 A1* | 6/2013 | Bouchon | 477/99 |
| 2014/0081491 A1* | 3/2014 | Gupta et al. | 701/22 |
| 2014/0121906 A1* | 5/2014 | Dlugoss et al. | 701/48 |
| 2014/0121916 A1* | 5/2014 | Dlugoss | 701/54 |
| 2014/0121923 A1* | 5/2014 | Dlugoss | 701/67 |
| 2014/0129104 A1* | 5/2014 | Park | 701/68 |

* cited by examiner

BINARY CLUTCH ASSEMBLY CONTROL IN NEUTRAL-TO-DRIVE OR NEUTRAL-TO-REVERSE TRANSMISSION SHIFTS

TECHNICAL FIELD

The disclosure relates to a system and method for controlling a binary clutch assembly in neutral transmission shifts.

BACKGROUND

A motor vehicle transmission typically uses interconnected gear elements and clutches to couple rotatable transmission input and output members, and to thereby establish a desired transmission speed ratio. Clutches are typically fluid-actuated devices having a series of friction plates. A hydraulic piston is actuated so as to compress the friction plates and to thereby transfer torque across the engaged clutch, or to stop rotation of the clutch and any connected members. Plate clutches are typically controlled with a variable rate of slip, such that the state of the clutch can range from fully applied to fully released and anywhere in between.

In some transmissions, a binary clutch assembly having, e.g., a selectable one-way clutch, a lockable freewheeling element, or a dog clutch, is used alone or in conjunction with the rotating and/or braking plate clutches to establish one or more gear states. Unlike conventional plate clutches, a binary clutch, as the name indicates, has just two possible states: fully applied and fully released. When fully released, the binary clutch may freewheel in either rotational direction, and thus one side of the binary clutch effectively slips with respect to the other side.

SUMMARY

A vehicle is disclosed herein having a transmission with a binary clutch assembly. The transmission is driven via an engine or another prime mover, and includes one or more gear sets, at least one node of which is connected to the binary clutch assembly. The binary clutch assembly of the present invention may be any torque transfer device having just two states: fully-applied and fully-released. For example, as noted above a binary clutch assembly may be embodied as a selectable one-way clutch, a freewheeling element, or a dog clutch. A controller of the transmission is in communication with the binary clutch assembly and with the engine. The controller detects a requested neutral shift of the transmission, which as used herein refers to a any requested change in the binary clutch state, either manually or automatically requested, occurring while driving in a neutral state into either drive or reverse.

In response to the requested shift, the controller selectively reduces slip across the binary clutch assembly, i.e., reduces the relative speed across the binary clutch assembly, by commanding a calibrated energy pulse from the engine, for instance a calibrated engine speed or engine torque pulse. The calibrated energy pulse reduces slip at the connected node(s) to a target slip of approximately zero, with "approximately" as used herein meaning a substantial reduction of slip to within a calibrated small range of zero, e.g., ±5 RPM, such that any disturbances are minimized when the binary clutch assembly is ultimately applied/engaged. The controller then commands an immediate engagement of the binary clutch assembly. The transmission may be shifted thereafter into the requested drive or reverse gear state.

In particular, a vehicle is disclosed herein that includes an internal combustion engine, a transmission, and a controller. The transmission includes a plurality of gear sets each having a plurality of nodes, and also includes an input member and a binary clutch assembly. The input member may be continuously connected to the engine and to one of the gear sets. The binary clutch assembly may be connected to the same gear set as the input member. The controller detects a requested shift of the transmission from a neutral state to one of a reverse and a drive state, and then commands, via a processor, a calibrated energy pulse from the engine to the input member. The calibrated energy pulse has a rate of increase sufficient for reducing slip across the binary clutch assembly to a target slip of approximately zero. The controller then engages the binary clutch assembly, and may thereafter shift the transmission into the reverse or drive state from neutral within a calibrated window of initiation of the commanded calibrated energy pulse.

A method includes detecting, via a controller having a processor, a requested shift of a transmission to drive or reverse from neutral, with the transmission including a plurality of gear sets each having a plurality of nodes, an input member continuously connected to an engine and one of the gear sets, and a binary clutch assembly connected to the same gear set as the input member. The method also includes commanding a calibrated energy pulse from the engine via the processor in response to the requested shift to thereby reduce slip across the binary clutch assembly to approximately zero, i.e., sufficiently close to zero to minimize disturbances when applying the binary clutch assembly, and then applying the binary clutch assembly within a calibrated window of commanding the calibrated energy pulse. The method further may include shifting the transmission into drive or reverse after applying the binary clutch assembly.

A transmission in one embodiment includes first, second, and third gear sets each having multiple nodes, an input member, a binary clutch assembly, and a controller. The input member is selectively connected to the first gear set and continuously connected to the second gear set, and receives input torque from a prime mover such as an engine. The binary clutch assembly is connected to the first and second gear sets. The controller is configured to command the energy pulse from the prime mover as set forth above.

The above features and the advantages of the present disclosure are readily apparent from the following detailed description of the best modes for carrying out the invention when taken in connection with the accompanying drawings.

DETAILED DESCRIPTION

Figure 1:
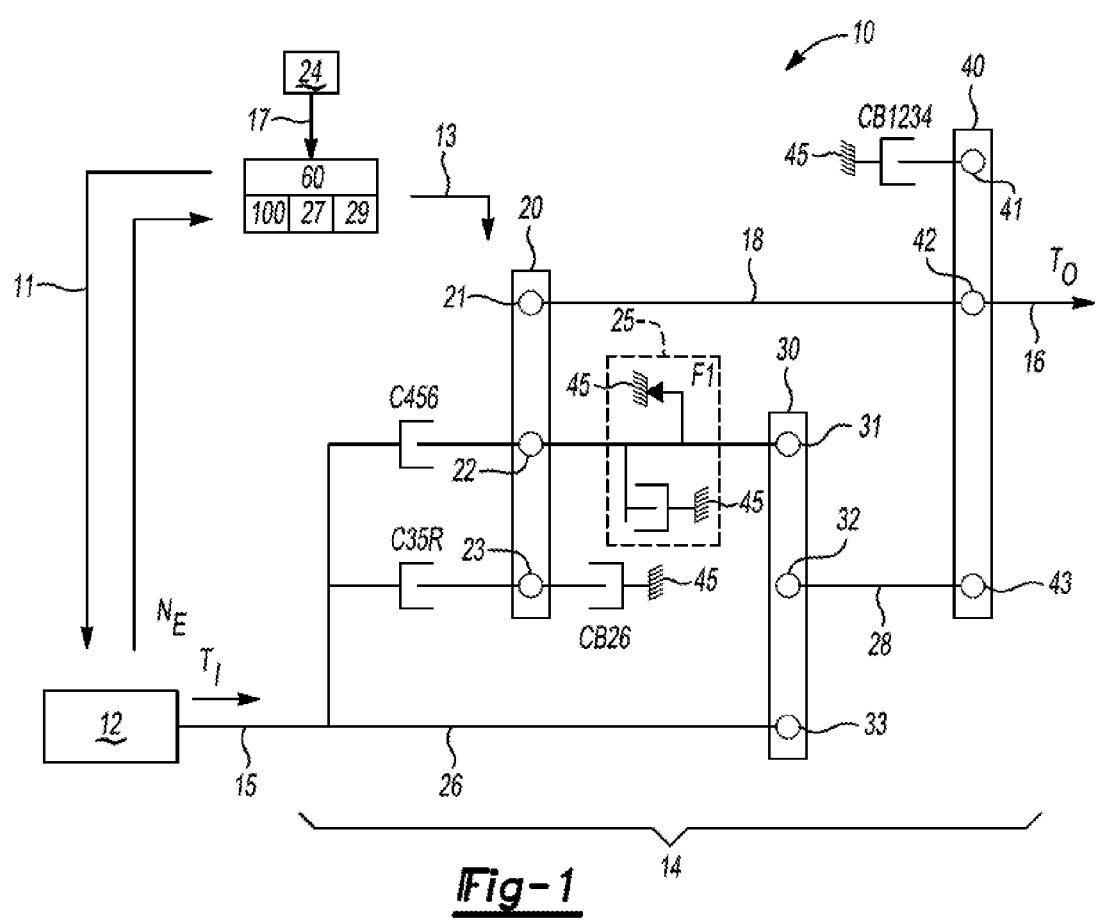
FIG. 1 is a schematic illustration of an example vehicle having an automatic transmission with a binary clutch assembly, the slip across which is controlled in a shift from neutral to drive or reverse via the presently disclosed control method.

Referring to the drawings, an example vehicle 10 is shown schematically in FIG. 1 having an internal combustion engine 12 and an automatic transmission 14. The transmission 14 is shown as a schematic lever diagram, as will be understood by those having ordinary skill in the art. At least one node of the transmission 14 is connected to a binary clutch assembly 25, e.g., a selectable one-way clutch, a freewheeling element such as element F1, a dog clutch, or any other clutch device having the binary states of fully applied/engaged and fully released.

A controller 60 is in communication with the binary clutch assembly 25 and the engine 12. The controller 60 is configured to detect a required or requested shift of the transmission 14 from a neutral state into either drive or reverse. As described herein, the controller 60 makes selective use of a calibrated engine energy pulse, e.g., speed or torque, to thereby take advantage of inertia in the transmission 14. The controller 60 does this by effectively pulling the binary clutch assembly 25 into or sufficiently close to a target slip of zero before any other inertial components of the transmission 14 can begin to influence the connected node(s). The binary clutch assembly 25 is then applied within a short calibrated window after commanding the pulse. An example method 100 for doing this is described below with reference to FIGS. 2 and 3, with the method 100 reducing the noise, vibration, and harshness (NVH) of the application of the binary clutch assembly 25, as well as the subsequent shift from neutral into drive or reverse as explained below.

The transmission 14 of FIG. 1 includes an input member 15 and output member 16. The respective input and output members 15 and 16 are selectively connected to each other at a desired speed ration via a plurality of gear sets. In the example embodiment of FIG. 1, the transmission 14 is a 6-speed automatic transmission having three planetary gear sets, i.e., a first gear set 20, a second gear set 30, and a third gear set 40. However, other configurations may be used without departing from the intended inventive scope. Input torque (arrow $T_I$) from the engine 12 or another prime mover, such as an electric traction motor, is transferred through the transmission 14 such that output torque (arrow $T_O$) is ultimately transferred to the output member 16, and thereafter to the drive axles and drive wheels (not shown).

In response to the detected requested shift, the controller 60 first selectively reduces slip across the binary clutch assembly 25. That is, the controller 60 reduces the relative speed across the binary clutch assembly 25 by commanding a calibrated energy pulse, i.e., a speed or torque pulse, from the engine 12. The calibrated engine energy pulse reduces slip at the connected node(s) to zero or near zero, after which the controller 60 commands an engagement of the binary clutch assembly 25. Once the binary clutch assembly 25 is applied/locked, the controller 60 may shift the transmission 14 into the commanded gear state.

The first gear set 20 of FIG. 1 includes first, second, and third nodes 21, 22, and 23, respectively. The second and third gear sets 30 and 40 likewise have respective first, second, and third nodes. For the second gear set 30, the first, second, and third nodes are nodes 31, 32, and 33, respectively. The third gear set 30 includes respective first, second, and third nodes 41, 42, and 43.

With respect to the first gear set 20, the first node 21 is continuously connected to the second node 42 of the third gear set 40 via an interconnecting member 18. The second node 22 is selectively connected to the engine 12 and the input member 15 via a first rotating clutch C456. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. Engagement of the binary clutch assembly 25 locks the nodes 22 and 31 to a stationary member 45 of the transmission 14. The second node 32 is continuously connected to the third node 43 of the third gear set 40 via another interconnecting member 28. The third node 33 is continuously connected to the input member 15 directly or via another interconnecting member 26. The first node 41 of the third gear set 40 is selectively connected to the stationary member 45 via a second braking clutch CB1234.

The controller 60 shown schematically in FIG. 1 may be embodied as a digital computer device or multiple such devices in communication with the engine 12 and with a PRNDL (park, reverse, neutral, drive, low) valve 24. The controller 60 thus receives, either directly or via an engine control module (not shown), and engine speed (arrow $N_E$) and a PRNDL setting (arrow 17). The controller 60 selectively transmits an engine control signal (arrow 11) requesting an engine energy pulse as explained below with reference to FIGS. 2 and 3 in response to movement of the PRNDL valve 24 into drive (D) or reverse (R) from neutral (N), or otherwise detects such a requested shift. After transmitting the engine control signal (arrow 11), the controller 60 waits a calibrated duration, e.g., approximately 0.25 s to 0.75 s in a possible embodiment, which may be determined via a timer in one possible embodiment, and then commands application/engagement of the binary clutch assembly 25 via a clutch control signal (arrow 13).

Structurally, the controller 60 includes at least one processor 27 along with tangible, non-transitory memory 29, e.g., read-only memory (ROM), flash memory, optical memory, additional magnetic memory, etc. The controller 60 may also include random access memory (RAM), electrically programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing the method 100 for controlling slip across the binary clutch assembly 25 are recorded in the memory 29 and executed via the processor(s) 27.

Figure 2:
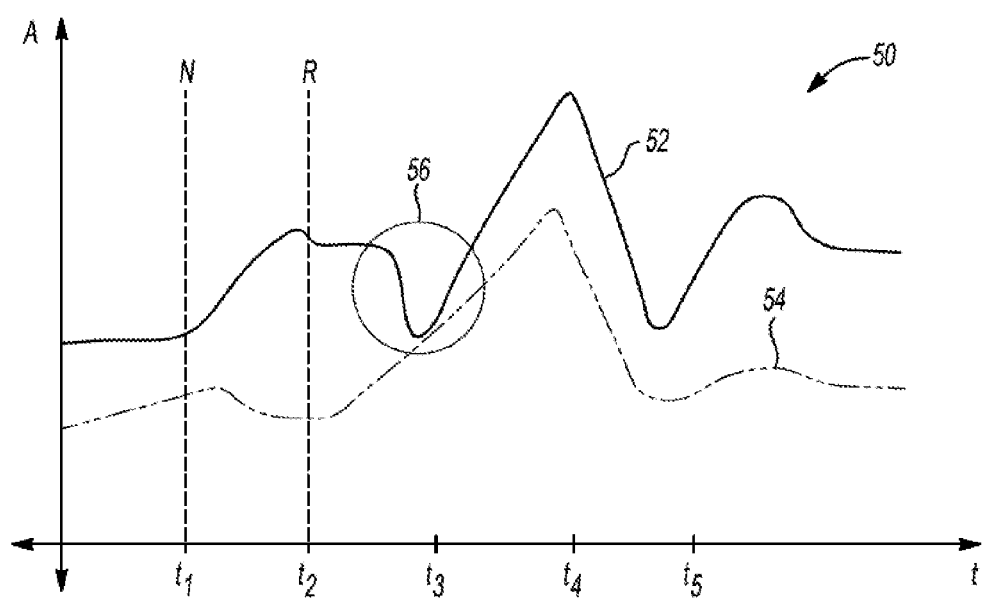
FIG. 2 is a set of traces describing vehicle parameters controlled in the execution of the present slip control method.

Referring to FIG. 2 in conjunction with the structure of FIG. 1, a set of traces 50 illustrates two vehicle parameters used to control slip across the binary clutch assembly 25. Amplitude (A) is plotted on the vertical axis, while time (t) is plotted on the horizontal axis. The first trace 52 is the relative speed/slip across the binary clutch assembly 25. The second trace 54 is engine speed, i.e., arrow $N_E$ of FIG. 1. At $t_1$, the PRNDL valve 24 is set to neutral. Slip across the binary clutch assembly 25, which is released in neutral along with all of the other clutches of the transmission 14, is not controlled, and thus may vary unpredictably, with the illustrated first trace 52 being illustrative of such variance.

At $t_2$ in FIG. 2, the PRNDL valve 24 may be shifted into reverse (R) to request a shift into the reverse gear state. This requested shift could also be into drive (D) as noted above. Immediately after detection by the controller 60 of the requested shift, the controller 60 transmits the engine control signal (arrow 11) to cause a single energy pulse, e.g., in engine speed, as represented by the second trace 54. The energy pulse from the engine 12 acts on the third node 33 of the second gear set 30 in the example embodiment of FIG. 1. As a result, rotation briefly occurs counterclockwise around the first node 31 as viewed in FIG. 1. This momentary rotation effectively reduces slip across the binary clutch assembly 25 sufficiently close to zero before any other inertial components of the transmission 14, in this instance the first and third gear sets 20 and 30, respectively, can begin to influence the connected node(s) 22 and 31.

The controller 60 of FIG. 1 then transmits the clutch control signal (arrow 13 of FIG. 1) to the binary clutch assembly 25 within a calibrated engagement window 56 after initiation of the engine energy pulse. As evident from FIG. 2, waiting beyond the calibrated engagement window 56, e.g., after approximately $t_3$, could result in a subsequent rise in slip as the other inertial components of the transmission 14 begin to react to the pulse. Therefore, waiting until after the energy pulse has peaked ($t_4$) and decayed ($t_5$) to apply the binary clutch assembly 25 could largely defeat the NVH reduction benefits provided by the present control method 100.

Figure 3:
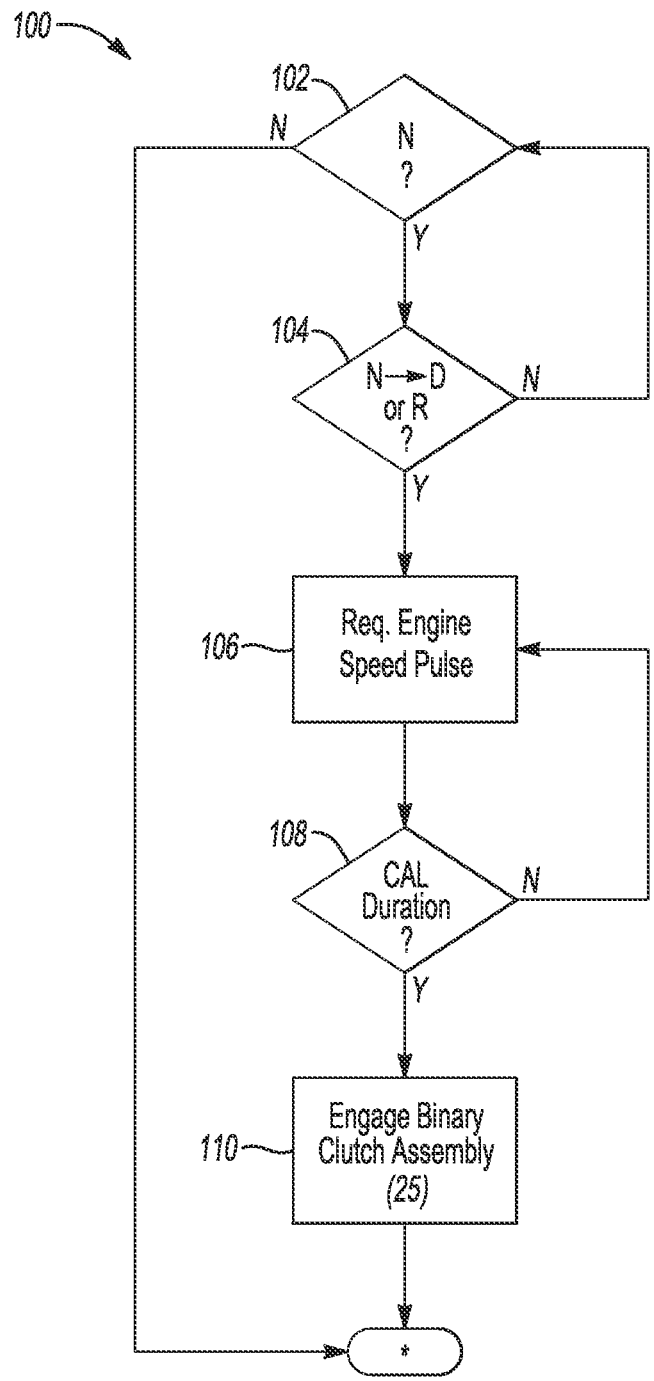
FIG. 3 is a flow chart describing an example method for reducing slip across the binary clutch assembly preparatory to a shift from neutral into drive or reverse.

Referring to FIG. 3, an example embodiment is depicted for the method 100 noted above. Beginning with step 102, the controller 60 of FIG. 1 determines whether the transmission 14 is operating in a neutral state with all clutches disengaged. Step 102 may entail receiving the PRNDL setting (arrow 17) from the PRNDL valve 24, measuring a position of a PRNDL lever (not shown), or any other step suitable for identifying that the transmission 14 is presently operating in the neutral state. The method 100 proceeds to step 104 if the transmission 14 is presently in neutral. Otherwise, the method 100 is finished (*).

At step 104, the controller 60 determines whether a shift has been commanded or requested into drive or reverse from the neutral state. As with step 102, step 104 may entail receiving the PRNDL setting (arrow 17) from the PRNDL valve 24 of FIG. 1 or any other suitable approach for detecting a commanded binary clutch apply or shift into one of the required or requested gear states. The method 100 proceeds to step 106 when such a requested shift is detected. Otherwise, the method 100 repeats step 102.

At step 106, the controller 60 automatically requests a calibrated engine speed pulse from the engine 12 via the engine control signal (arrow 11). The size of the energy pulse depends on the configuration of the transmission 14, particularly the inertia of the elements receiving the engine energy pulse. Essential to step 106 is the rate of increase of the energy pulse, i.e., the speed at which the engine energy pulse is generated, as opposed to the target speed or torque used as the peak of the pulse. That is, the engine pulse must rise fast enough to cause the connected gear set to rotate, e.g., the second gear set 30 in the example embodiment of FIG. 1. Step 106 typically involves transmitting a single calibrated pulse. Once the engine pulse has been commanded, the method 100 proceeds to step 108.

At step 108, the controller 60 may initiate a timer to thereby count through a calibrated duration. The duration should allow a sufficient amount of time to pass after commanding the energy pulse at step 106 to change the direction of rotation of the connected lever, e.g., the second gear set 30. Step 108 ensures enough time has elapsed for the onset of the calibrated engagement window 56 of FIG. 2. Steps 106 and 108 may be repeated in a loop until the controller 60 determines at step 108 that the timer has elapsed, or that it otherwise appropriate to continue, at which point the method 100 proceeds to step 110.

At step 110, the binary clutch assembly 25 is engaged in the calibrated engagement window 56 of FIG. 2. Once engaged, the controller 60 commences with shifting the transmission 14 into the commanded state, which is either drive or reverse. The ensuing shift should have a reduced level of NVH during engagement of the binary clutch assembly 25 relative to conventional approaches, which in neutral provide no control over the slip of the binary clutch assembly 25.

As will be appreciated by those having ordinary skill in the art, the present approach may be used with any transmission having the ability to control a node and influence a reaction on another node, where the pivot points of the various interconnected gear sets have a tendency to remain inert or have a higher friction (drag or losses). In such a transmission, it is recognized herein that the control and reaction nodes can be predictably controlled from the neutral state using an energy pulse from the engine 12 of FIG. 1, i.e., an engine speed or torque pulse.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine; and
   a transmission having:
      a plurality of gear sets each having a plurality of nodes;
      an input member that is continuously connected to the engine and to one of the gear sets;
      a binary clutch assembly that is connected to the same gear set as the input member, wherein the binary clutch assembly has just two possible states: fully applied and fully released; and
      a controller in communication with the engine and with the binary clutch, wherein the controller includes a processor that is operable to:
         detect a requested shift of the transmission from a neutral state to one of a reverse and a drive state;
         command, via the processor, a calibrated energy pulse from the engine to the input member in response to the detected requested shift, wherein the calibrated energy pulse is a calibrated speed pulse or a calibrated torque pulse that has a rate of increase sufficient for reducing slip across the binary clutch assembly to a target slip of approximately zero; and
         apply the binary clutch assembly a calibrated duration after commanding the calibrated energy pulse.

2. The vehicle of claim 1, wherein the controller is further operable to shift the transmission into the reverse or drive state after applying the binary clutch assembly.

3. The vehicle of claim 1, wherein the transmission includes a first and a second gear set, and wherein the binary clutch assembly is connected between nodes of the first and second gear sets.

4. The vehicle of claim 3, wherein the transmission includes a pair of rotating clutches each selectively connecting the engine to different nodes of the first gear set.

5. The vehicle of claim 1, wherein the binary clutch assembly includes one of a selectable one-way clutch, a freewheeling element, and a dog clutch.

6. A method comprising:
   detecting, via a controller having a processor, a requested shift of a transmission to drive or reverse from neutral, wherein the transmission includes a plurality of gear sets each having a plurality of nodes, an input member that is continuously connected to the engine and to one of the gear sets, and a binary clutch assembly that is connected to the same gear set as the input member, wherein the binary clutch assembly has just two possible states: fully applied and fully released;

commanding a calibrated energy pulse from the engine via the processor in response to the requested shift to thereby reduce slip across the binary clutch assembly to a target slip of approximately zero, including commanding one of a calibrated engine speed pulse and a calibrated engine torque pulse;

initiating a timer after commanding the calibrated energy pulse to determine a calibrated duration; and applying the binary clutch assembly within the calibrated duration of commanding the energy pulse.

7. The method of claim 6, further comprising: shifting the transmission into drive or reverse via the controller after applying the binary clutch assembly.

8. The method of claim 6, wherein applying the binary clutch assembly includes applying a selectable one-way clutch.

9. The method of claim 6, wherein applying the binary clutch assembly includes applying a freewheeling element.

10. The method of claim 6, wherein applying the binary clutch assembly includes applying a dog clutch.

11. A transmission comprising:

first, second, and third gear sets each having multiple nodes;

an input member that is selectively connected to the first gear set and continuously connected to the second gear set, wherein the input member receives input torque from a prime mover; and a binary clutch assembly that is connected to the first and second gear sets, wherein the binary clutch assembly has just two possible states: fully applied and fully released; and a controller in communication with the prime mover and with the binary clutch assembly;

wherein the controller includes a timer, a processor, and tangible, non-transitory memory on which is recorded instructions for controlling slip across the binary clutch assembly preparatory to a requested shift of the transmission from neutral into reverse or drive, and wherein the controller is configured to execute the instructions from the memory to thereby:

detect the requested shift;

command, via the processor, a calibrated energy pulse from the engine to the input member in response to the detected requested shift, wherein the calibrated energy pulse is one of a calibrated engine speed pulse and a calibrated engine torque pulse that has a rate of increase sufficient for reducing slip across the binary clutch assembly to a target slip of approximately zero;

wait a calibrated duration via the timer after commanding the calibrated energy pulse; and apply the binary clutch assembly the calibrated duration after commanding the calibrated energy pulse.

12. The transmission of claim 11, wherein the controller is further configured to shift the transmission into the reverse or drive state after applying the binary clutch assembly.

13. The transmission of claim 11, wherein the binary clutch assembly includes one of a selectable one-way clutch, a freewheeling element, and a dog clutch.

* * * * *